(12) United States Patent
O'Kell et al.

(10) Patent No.: US 11,214,192 B2
(45) Date of Patent: Jan. 4, 2022

(54) EMERGENCY LIGHTING SYSTEM

(71) Applicant: Saf-T-Glo Limited, Cwmbran (GB)

(72) Inventors: Sean Patrick O'Kell, Swaffham (GB); Andrew Jon Hallett, Swaffham (GB)

(73) Assignee: SAF-T-GLO LIMITED, Cwmbran (GB)

(*) Notice: Subject to any disclaimer, the term of this patent is extended or adjusted under 35 U.S.C. 154(b) by 168 days.

(21) Appl. No.: 16/710,333

(22) Filed: Dec. 11, 2019

(65) Prior Publication Data
US 2020/0223355 A1    Jul. 16, 2020

(30) Foreign Application Priority Data

Dec. 12, 2018  (GB) ...................................... 1820277

(51) Int. Cl.
| | |
|---|---|
| *B64D 25/00* | (2006.01) |
| *B60Q 3/46* | (2017.01) |
| *B64D 11/00* | (2006.01) |

(52) U.S. Cl.
CPC ............... *B60Q 3/46* (2017.02); *B64D 11/00* (2013.01); *B64D 2011/0038* (2013.01); *B64D 2011/0053* (2013.01)

(58) Field of Classification Search
CPC ... B64D 45/00; B64D 11/00; B64D 2045/007
See application file for complete search history.

(56) References Cited

U.S. PATENT DOCUMENTS

| | | | | |
|---|---|---|---|---|
| 4,794,373 A | * | 12/1988 | Harrison ................ | B64D 25/00 307/10.8 |
| 5,775,016 A | | 7/1998 | Chien | |
| 5,961,072 A | * | 10/1999 | Bodie ..................... | B60Q 3/46 244/118.5 |
| 6,237,266 B1 | | 5/2001 | Tassey et al. | |

(Continued)

FOREIGN PATENT DOCUMENTS

| | | |
|---|---|---|
| DE | 10043251 A1 | 4/2002 |
| GB | 2 365 113 A | 2/2002 |

(Continued)

OTHER PUBLICATIONS

Search Report and Written Opinion regarding corresponding GB Application No. 1820277.0, dated Jun. 5, 2019, 7 pps.
Search Report for GB 1918210.4 dated Jun. 8, 2020 2 pages.

*Primary Examiner* — Andrew J Coughlin
(74) *Attorney, Agent, or Firm* — Foley & Lardner LLP (57) ABSTRACT

An aircraft includes an aircraft cabin having a number of rows of seats, at least one aisle, and at least one exit. An emergency lighting system having a first and second lines on opposing sides of the aisle, each line comprising a non-continuous series of photoluminescent markers separated by at least a longitudinal distance in the direction of the respective line. An exit path identifier is arranged to guide passengers from the aisle to the exit. Each line comprises an alternating series of first and second markers. The first photoluminescent markers have a first length and the second markers have a second length, the first length either the same (Continued)

as or shorter than the second length. At least the second markers are located on or adjacent to a seat adjacent to the aisle and the first markers are arranged to block the non-exit paths.

16 Claims, 6 Drawing Sheets

(56) References Cited

U.S. PATENT DOCUMENTS

| | | | | |
|---|---|---|---|---|
| 6,307,207 | B1* | 10/2001 | Burbank | A62B 3/00 |
| | | | | 250/462.1 |
| 6,499,421 | B1* | 12/2002 | Honigsbaum | G09F 19/22 |
| | | | | 116/205 |
| 6,874,919 | B2* | 4/2005 | Stokes | A62B 3/00 |
| | | | | 362/146 |
| 2006/0163429 | A1 | 7/2006 | Lierow | |
| 2007/0097664 | A1 | 5/2007 | Stokes et al. | |
| 2008/0253139 | A1* | 10/2008 | Stokes | A62B 3/00 |
| | | | | 362/471 |
| 2015/0252951 | A1* | 9/2015 | Biehl | F21K 2/00 |
| | | | | 362/166 |

FOREIGN PATENT DOCUMENTS

| | | |
|---|---|---|
| WO | WO-99/10234 | 3/1999 |
| WO | WO-00/70586 | 11/2000 |
| WO | WO-01/52224 A1 | 7/2001 |
| WO | WO-2010/092148 A1 | 8/2010 |
| WO | WO-2014/125301 | 8/2014 |
| WO | WO-2017/089838 | 6/2017 |

* cited by examiner

EMERGENCY LIGHTING SYSTEM

CROSS-REFERENCE TO RELATED APPLICATIONS

The present application claims priority to and the benefit of United Kingdom Priority Application No. 1820277.0, filed Dec. 12, 2018, the entire disclosure of which is incorporated by reference herein.

BACKGROUND

The present application relates to improvements in or relating to emergency lighting systems for use in a vehicle and particularly for use in aircraft. The application is particularly concerned with systems arranged to indicate an escape path leaving to an exit for evacuation of an aircraft in an emergency, for example following an accident.

It is known to provide emergency exit lighting systems particularly in aircraft to guide passengers to an emergency exit in the event of an emergency. The emergency exit lighting systems are arranged to provide illumination at a low level, typically along a floor of the aircraft cabin in case of an emergency. It is required that emergency lighting is located on the floor of the cabin in case the cabin is filled with smoke and higher level illumination or guidance markers are no longer visible. In this context "low level illumination" is understood by the skilled person to be below 4 ft (1.2 m).

Existing aircraft safety regulations state that in order to comply with regulations, it is necessary to provide two continuous lines of photoluminescent marking in the aisle of an aircraft. The regulations specify that the continuous means "without significant breaks". In typical installations, the photoluminescent markers along the aisle comprise a number of sections of photoluminescent strips which are joined together and several inches around the join need not be luminescent where the photoluminescent strips meet or are joined together. Each line of photoluminescent marker therefore comprises a number of joints along the length of the aisle. There may be a break of several inches in the luminescence at joints between sections of marker. A maximum length of the break between photoluminescent markers is specified by aircraft safety regulations in order for the photoluminescent markers to be considered to be considered to be continuous lines and to comply with the regulations.

It has been found that it is necessary to exercise care in the location of the breaks in luminescence in case the break occurs in a location where an evacuee may interpret the break in photoluminescent as indicating the location of an exit. Misinterpretation of the location of an exit can lead to delay in the evacuation and confusion and distress for the evacuee.

In addition it is common for the photoluminescent markers to be used in combination with conventional battery powered exit markers and cross aisle markers in a hybrid system such that the photoluminescent markers comprise a subsystem of the emergency marking system.

Existing safety requirements for emergency marking systems specify that the photoluminescent elements must provide sufficient illumination in certain standard scenarios.

The first scenario may be referred to as the "first flight of the day" scenario. In this scenario, the aircraft is assumed to be been without power overnight and to have been prepared ready for flight with the photoluminescent elements being charged to a necessary level ready for flight. At this point on take-off the photoluminescent material will have been charged sufficiently to provide a specified output for the duration of the flight.

The second scenario may be referred to as the "maximum overnight flight" scenario. In this scenario, the aircraft is assumed to fly at night for the maximum duration allowed by the performance characteristic of the aircraft. During the overnight flight duration, it is assumed that the passenger aircraft cabin will be either dark or in a subdued lighting environment for a significant portion of the duration in order to allow passengers to sleep or to rest. During the darkened cabin period, the photoluminescent elements will be discharging. The second scenario assumes that an inflight emergency occurs prior to landing which will prevent normal cabin illumination and recharging of the photoluminescent elements. The inflight emergency is also assumed to include dense smoke in the upper areas of the cabin such that overhead emergency lighting cannot partially recharge floor level photoluminescent elements. Thus the second scenario tests the guidance and light output of the photoluminescent markers at the lowest expected performance.

For powered emergency lighting used in exit and cross aisle subsystems, the safety requirements specify that power is supplied to each emergency lighting unit to provide the required level of illumination for at least 10 minutes after an emergency landing at the critical ambient conditions.

It would be advantageous to provide an improved emergency lighting system that addresses these requirement as well as providing additional advantages.

DETAILED DESCRIPTION OF EXEMPLARY EMBODIMENTS

According to an exemplary embodiment, there is provided an emergency lighting system that includes (i) a first and a second line along an aisle of an aircraft cabin, each line comprising a non-continuous series of photoluminescent markers separated by a distance and (ii) an exit path identifier to guide passengers from the aisle to the exit.

In one embodiment, each line includes a series of first photoluminescent markers having a first length and series of second markers having a second length wherein the first length is shorter than the second length.

According to a first aspect, there is provided an aircraft including an aircraft cabin having a number of rows of seats, at least one aisle, at least one exit, and an emergency lighting system that includes a first line located on one side of the aisle and a second line located on a second opposing side of the aisle, each line including a non-continuous series of photoluminescent markers separated by at least a longitudinal distance in the direction of the respective line. Each line includes an alternating series of first and second markers, where the first photoluminescent markers have a first length and the second markers have a second length. At least the second markers are located on or adjacent to a seat adjacent to the aisle and the first markers are arranged to block the non-exit paths and either the first length is the same as the second length or the first length is shorter than the second length. The emergency lighting system further includes an exit path identifier arranged to guide passengers from the aisle to the exit.

In a one embodiment, the first and second lines each include a series of markers wherein the first length is substantially the same as the second length.

In another embodiment, the first and second lines each include a series of first photoluminescent markers and series of second markers, where the first length is shorter than the second length.

Each line is non-continuous and includes a series of markers separated by a distance. The distance between the markers may be at least 6 inches (15 cm). In other embodiments the distance may be at least 10 inches (25 cm). The distance may be greater than 10 inches and may be for example between 15 and 25 inches or may be between 25 and 35 inches. The distance may be as much as 50 to 70 inches or for example 60 inches. Each marker may have a length. In some embodiments, the markers may have the same length as the distance between the markers. Preferably the distance between the markers is at least 10% of the length of the markers.

The exit path identifier may include at least one marker leading to the exit. The exit may be a normal door or an emergency exit to be used only in case of an emergency.

In some embodiments, the exit identifier may include at least one marker. In some embodiments, one marker may be provided to identify the location of the exit. In other embodiments, a first and a second marker may be located on either side of a path to the exit.

Optionally, the or each marker may include one or more markings visible in low light conditions. The markings may be selected from markings such as arrows, words, lines, shapes, different colors.

In a particular exemplary embodiment, the exit path identifier includes at least one powered light, or may comprise a powered series of lights.

In another particular embodiment, the exit path identifier includes an electrically powered light beam. The light beam may project a beam of light across the cabin. The light beam may be arranged to indicate the location of the exit by means of a projected line, marker, word or image. According to one particular exemplary embodiment, the light beam is arranged to be at a low level in the cabin, i.e. below 1.2 m.

The first and the second line along the aisle may be the same or may be different. According to an exemplary embodiment, the first line is located at or along one side of an aisle in the aircraft cabin. Preferably the second line is located at or along a second side of an aisle in the aircraft cabin. The first and/or the second lines may be arranged to be on the floor of an aircraft cabin in which the emergency lighting system is installed.

In other embodiments, the first and/or the second lines may be arranged to be at or near floor level. The first and the second lines may be arranged to provide low level illumination to passengers. The markers or the first and/or the second markers may be arranged to be below 1.2 m from the floor of the cabin.

In some embodiments, at least one of the photoluminescent markers is arranged to be provided on a part of a seat or seat frame. In some embodiments, at least one of the markers is arranged to be provided on the floor of the cabin.

In an exemplary embodiment, at least some of the markers are provided on the seat frames. The markers may be provided on a portion of a frame of the seat. The markers may be provided on a base of the seat or seat frame. According to other exemplary embodiments, the markers may be provided on a side or arm of the seat.

In an exemplary embodiment, each line includes a series of first photoluminescent markers having a first length and series of second markers having a second length, where the first length is shorter than the second length and desirably the second markers are located on the seat or seat frame.

The first series of markers and the second series of markers alternate according to an exemplary embodiment.

In one embodiment, the first and the second lines include a series of dots and dashes. In another embodiment, the first and the second lines include a series of first short lines and a series of second longer lines. Desirably, in at least some embodiments, there is a perceptual difference in the length of the markers.

In other embodiments, the first and second markers may have substantially the same length. In such embodiments, that markers provide a series of dashes along the aisle. A first series of markers may be provided in spaces between the seats and a second series of markers may be provided on the seats or seat frames.

In some embodiments, the distance between a marker of the first series and a marker of the second series is at least 6 inches (15 vcm). In other embodiments, the distance may be at least 10 inches (25 cm). Each marker may have a length. In some embodiments, the markers may have the same length as a distance between the markers. Preferably, the distance between the markers is at least 10% of the length of the markers.

According to one particular embodiment, the first and second markers alternate along the first and second lines. In one embodiment, the dots and dashes alternate along the first and second lines. In another embodiment, the relatively longer markers and the relatively shorter markers may be arranged to alternate along the first and second lines.

According to an exemplary embodiment, the exit and non-exit paths are clearly distinguished to provide way-guidance to an evacuee in the case of an emergency. The exit identifier indicates an exit path. Non-exit paths are indicated as such such that the non-exit paths are "blocked". In one embodiment, the first markers or dots, or shorter markers, are located along the first and second lines to "block" any non-exit paths. The markers are arranged such that the spaces between seats that do not lead to an emergency exit are clearly indicated to be non-exit paths. The first markers may be located in the spaces between the seats. In other embodiments, the first marker may be a relatively shorter marker may be used as a block the non-exit paths.

In some embodiments, the first and second lines include second markers in the form of dashes or relatively longer markers and these are located adjacent to or on a portion of the aisle seats in the aircraft cabin. The second markers may be located on a portion of the seat frame. In some embodiments, the second markers may be provided on a portion of the seat frame adjacent to the floor of the aircraft cabin. In other embodiments, the second markers may be provided on another part of the seat frame.

It is desirable that the second markers are located on a portion of an aisle seat that is visible at a low level to a passenger in the aisle. The second markers may be located on any portion of the seats that is visible to a passenger in the aisle of the aircraft cabin. The markers may be arranged to be located such that the markers are visible to a standing passenger. Desirably, the markers may be arranged to be located such that the markers are visible to a passenger moving along the aisle in an evacuation scenario. The second markers may be located on a base of the frame of a seat, or on a portion of the seat frame such as the back of the seat or a portion of the seat base, on an arm of the seat adjacent the aisle or on any other suitable part of the seat. In some embodiments, it is envisioned that the photoluminescent marker may be incorporated in at least part of a covering of the seat.

In one particular exemplary embodiment, the system includes a first and a second line along an aisle of an aircraft cabin, with each line including a series of photoluminescent markers separated by a distance. It is desired that each of the markers be located on a portion of seats arranged along the aisle.

Desirably, the portion of the aircraft cabin in which the photoluminescent markers are located includes lighting adapted and arranged to charge the photoluminescent markers. It is important that the lighting is arranged such that there is sufficient light to adequately charge the photoluminescent markers. In some embodiments, the system may further include lighting located and adapted and arranged to charge the photoluminescent material in the markers.

According to an exemplary embodiment, the photoluminescent markers include a photoluminescent pigment or a mixture of photoluminescent pigments or combination of compounds including at least one photoluminescent pigment that meet the emergency system requirements to be met. The photoluminescent pigments may be arranged to have an output that has a brightness and a duration that complies with the safety regulations.

Desirably, the photoluminescent markers include a covering or a protective layer. It is desirable that the photoluminescent markers are protected from the traffic and wear that is conventional in an aircraft cabin.

According to an exemplary embodiment, the photoluminescent markers are fabricated from non-flammable materials.

According to a second aspect, there is provided a method of retro-fitting an emergency lighting system to an aircraft having an aircraft cabin having rows of seats, at least one aisle, and at least one exit to provide an aircraft including an aircraft cabin in accordance with the first aspect. The method includes installing a first line located on one side of the aisle and a second line located on a second line located a second opposing side of the aisle of the aircraft cabin, with each line including a non-continuous series of photoluminescent markers separated by a longitudinal distance in the direction of the respective line. Each line includes an alternating series of first and second markers. The first photoluminescent markers have a first length and the second markers have a second length. At least the second markers are located on or adjacent to a seat adjacent to the aisle and the first markers are arranged to block the non-exit paths. Either the first length is the same as the second length or the first length is shorter than the second length. The method also includes installing the an exit identifier arranged to guide passengers from the aisle to the exit.

Figure 1:
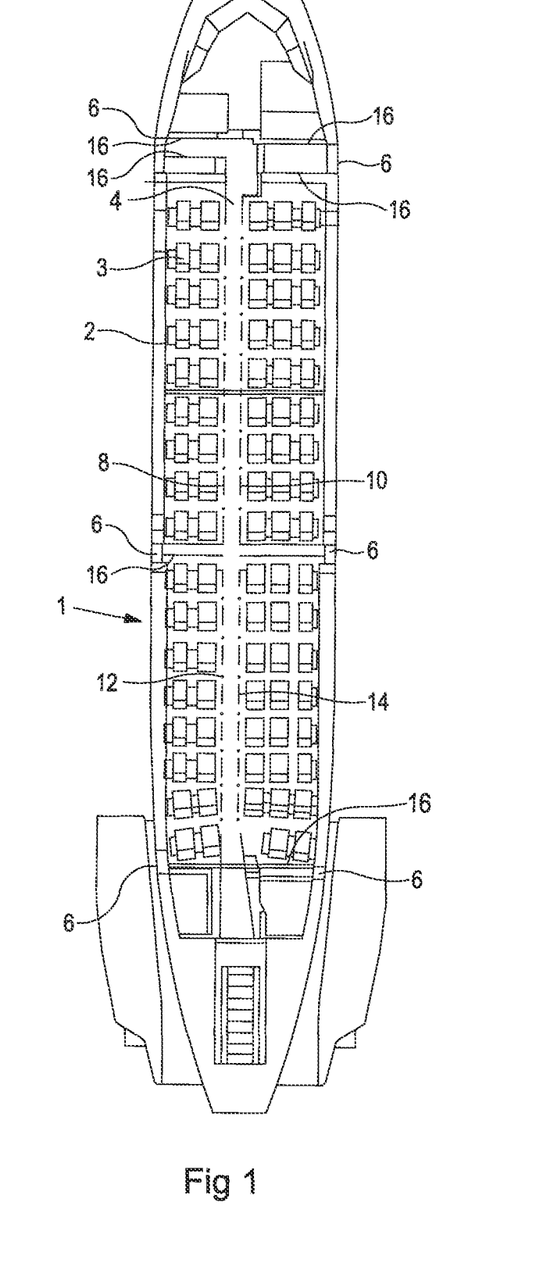
FIG. 1 is a schematic view of an aircraft according to an exemplary embodiment.

Turning now to the accompanying drawings, FIG. 1 is an overview of an aircraft in accordance an exemplary embodiment, and includes an aircraft 1 having aircraft cabin 2 with rows of seats 3, an aisle 4, and exits 6. The emergency lighting system includes a first line 8 and a second line 10 along opposing sides of the aisle 4, with each line including a series of non-continuous markers separated by a distance. In one embodiment, the line includes a series of first markers 12 and a series of second markers 14. The emergency lighting system further includes an exit path identifier 16 which is arranged to guide passengers from the aisle to the exit.

Figure 3:
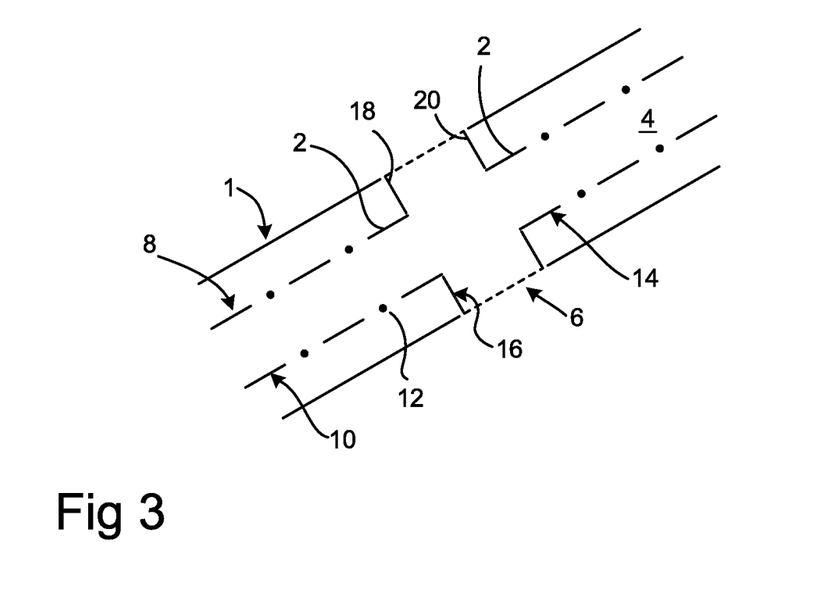
FIG. 3 is an overview of a portion of an emergency lighting system in an aircraft in accordance with an exemplary embodiment.

As can be better seen in FIG. 3, in this embodiment, the series of first markers are provided as dots that are located between the rows of seats. The series of second markers are provided as dashes and are arranged to be provided on a part of the seat frame.

In each line, the markers have a length. The distance between the markers may be arranged to be at least 10% of the length of the markers.

The distance may be more than 10 inches or more than 15 inches or more than 20 inches or more than 30, 40, 50, 60 or more inches.

In this embodiment, the exit path identifier 16 includes a pair of markers 18, 20 leading from the aisle to the exit 6. The exit may be a standard exit or an emergency exit. The markers include photoluminescent markers.

The first and second lines 8, 10 include alternating dots 12 and dashes 14. The first and second markers include photoluminescent markers. In this embodiment, the first markers 12 comprise dots. The dots are arranged to be located on the floor of the aircraft cabin and are arranged to be located in the spaces between the seats 2. The first markers 12 are arranged to provide no-exit indicators with regard to the path between the seats 2. It has been found that the dots 12 in the space between the seats act as a block for the non-exit path and assist passengers in identifying that the space between seat rows is not an exit path in the case of an emergency. In this embodiment, the second markers 14 comprise dashes. The first 8 and second lines 10 are arranged to be the same on either side of the aisle 4 as the arrangement of the aircraft cabin is symmetrical. It will be appreciated that if the arrangement of the seats in the aircraft cabin is not symmetrical then the first and second lines will not be arranged to be same on either side of the aisle.

It will be understood that the aircraft cabin lighting is arranged to provide adequate charging to the photoluminescent markers.

It will be appreciated that the or each photoluminescent marker may include one or more markings visible in low light conditions. The markings may be selected from markings such as arrows, words, lines, shapes, different colors. Typically, the markings are not readily visible in ambient lighting.

Figure 2:
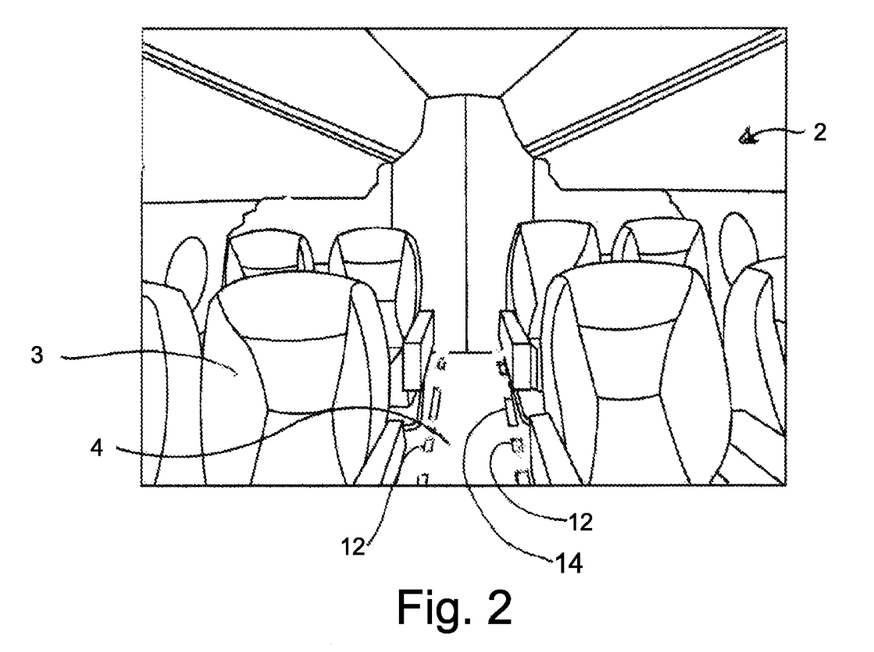
FIG. 2 is a schematic view of a portion of a cabin of an aircraft according to an exemplary embodiment.
Figure 4:
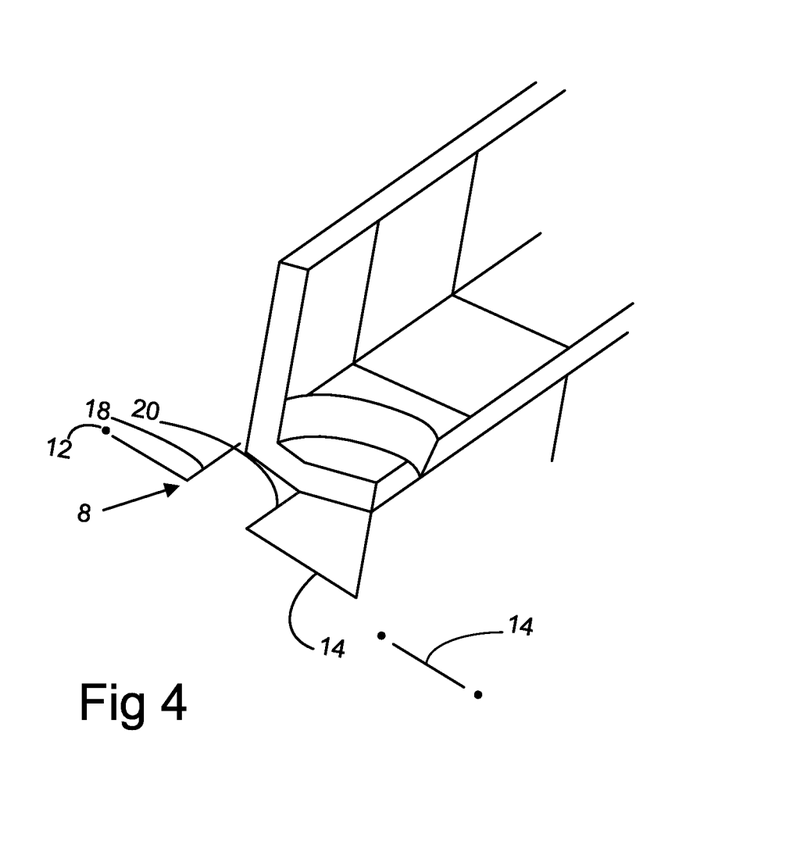
FIG. 4 is a perspective view of the emergency lighting system in a portion of an aircraft of FIG. 1.

FIG. 4 is a perspective view of a portion of the cabin. The exit identifier 16 imcludes first 18 and second 20 photoluminescent markers. FIG. 2 illustrates only one side of the aisle and so a first line 8 is illustrated. The first line 8 comprises the first 12 and second markers 14. The first markers 12 include dots located on the floor of the cabin and between the rows of seats 2. The second markers 14 include series of longer markers that are arranged on the seats 2. In this embodiment, the second markers 14 are located on a lower portion of the seat. The second markers are located on the seat frames at or adjacent to the aircraft floor. The longer dash markers provide a clear indication of the location of the seats.

In some embodiments, the lines include a series of markers each having the same length. The markers may be arranged to be located on the seats or on a portion of a seat frame. The markers may be located on a base of the seat frame, or on a base of the seat. The markers may be arranged to be located on arms of the seat or may be arranged to be located on a portion of the seat such as the base or back of the seat. According to some embodiments, the markers may be arranged to be a part of a seat covering. It will be appreciated that markers are provided to "block" the non-exit paths.

Figure 5:
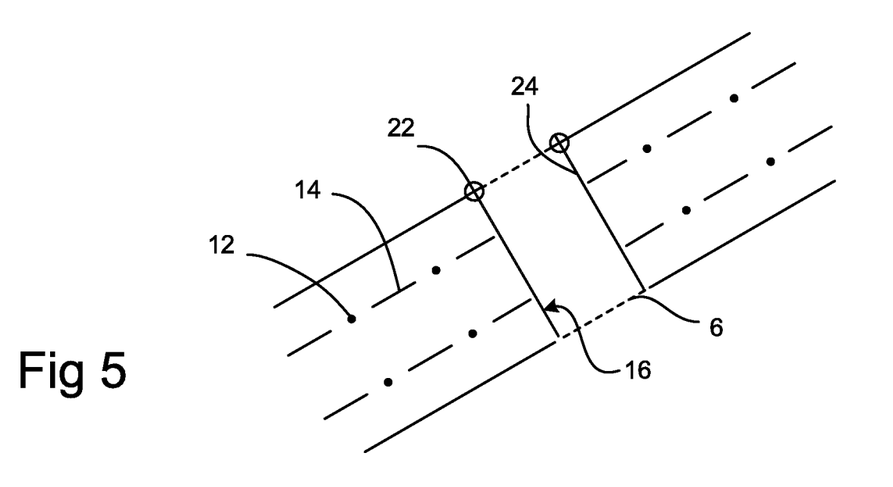
FIG. 5 is an overhead view of an emergency lighting system according to another exemplary embodiment.

FIG. 5 is an overhead view of another exemplary embodiment of the system. The first 12 and second 14 markers are the same as in the first embodiment. In this embodiment, the exit identifier 16 includes an electrically powered light 22 arranged to project an image or a beam of light 24 across the cabin to identify the or each exit 6 to an evacuee. In this embodiment, there is an exit on either side of the cabin. The exit identifier 16 includes a first powered light 22 and second powered light 22'. The first and second powered lights are arranged on either side of the path leading to the exits.

Typically, the low level light beam is at or below seat level in an aircraft. According to an exemplary embodiment, a source of the light beam is less than 1.2 m or more preferably less than 0.5 m from the aircraft cabin floor.

Figure 6:
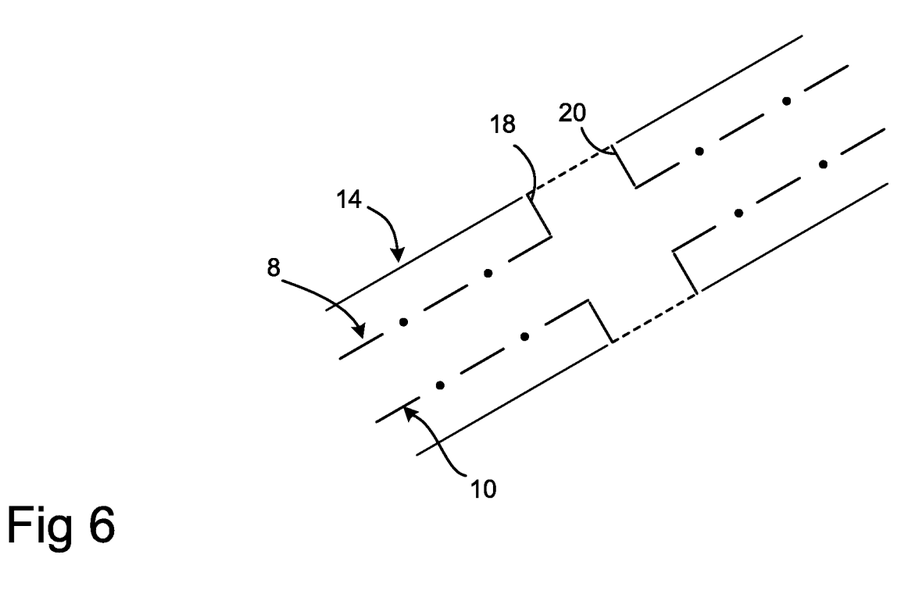
FIG. 6 is an overhead view of an emergency lighting system according to another exemplary embodiment.

Referring now to the embodiment illustrated in FIG. 6, the exit identifier in this embodiment comprises photoluminescent markers 18, 20 located on either side of the path towards the exit 6. In this embodiment, the first 8 and second lines 10 include alternating first markers and second markers 14. The second markers as before include a relatively longer photoluminescent marker. The first markers in this embodiment include relatively shorter photoluminescent emergency markers.

Figure 7:
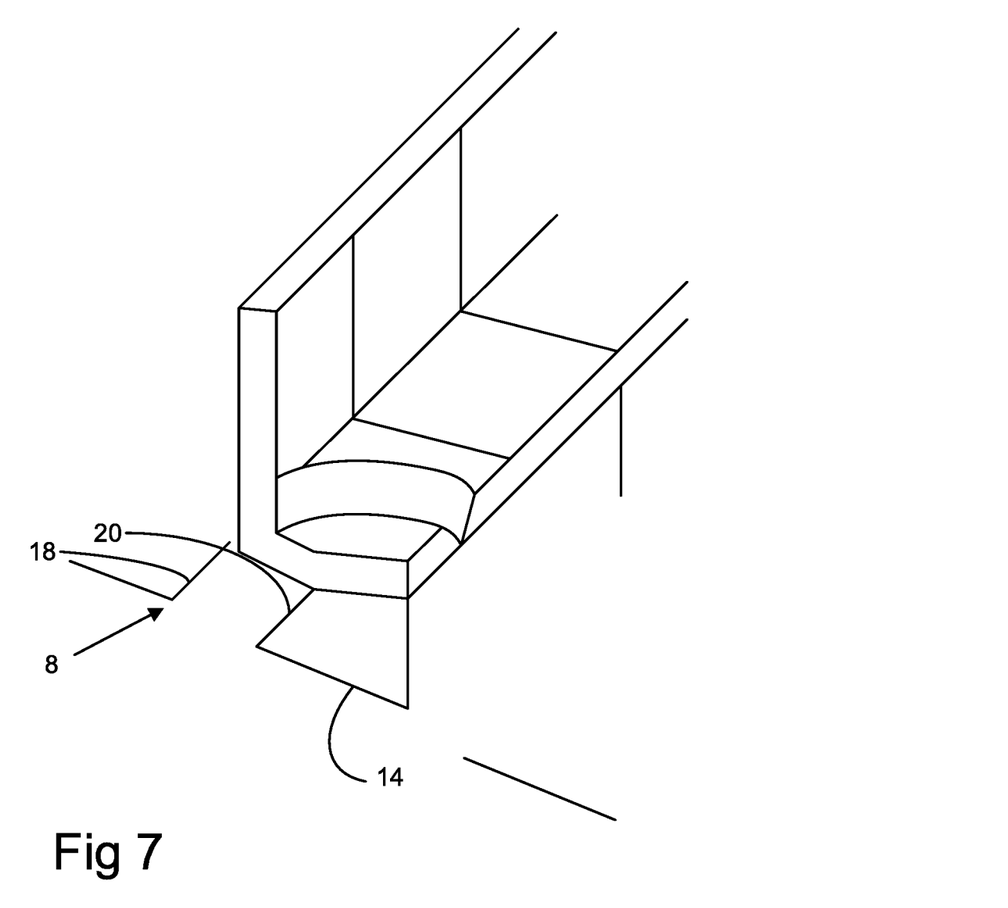
FIG. 7 is a perspective view of a portion of the emergency lighting system of FIG. 4 in an aircraft.

FIG. 7 is a perspective view of a portion of the cabin incorporating the system of FIG. 6. The exit identifier comprises first 18 and second 20 photoluminescent markers. FIG. 7 illustrates only one side of the aisle and so a first line 8 is illustrated. The first line 8 includes the first and second markers 14 which are the same or substantially the same length. The first markers are located on the floor of the cabin and between the rows of seats. A distance is provided between each marker so that the line has the appearance of a series of dashes. The markers 14 may be arranged on the seats or the seat frames. In this embodiment, the markers 14 are located on a lower portion of the seat. The markers 14 are located on the seat frames at or adjacent to the aircraft floor. The markers 14 provide a clear indication of the location of the seats. It will be appreciated that photoluminescent markers are provided between the seats to indicate that the space between the seats is not an exit path. Such markers act to block the non-exit path. The markers between the seats may have a length that is substantially the same as the length of the markers provided on the seats.

Figure 8:
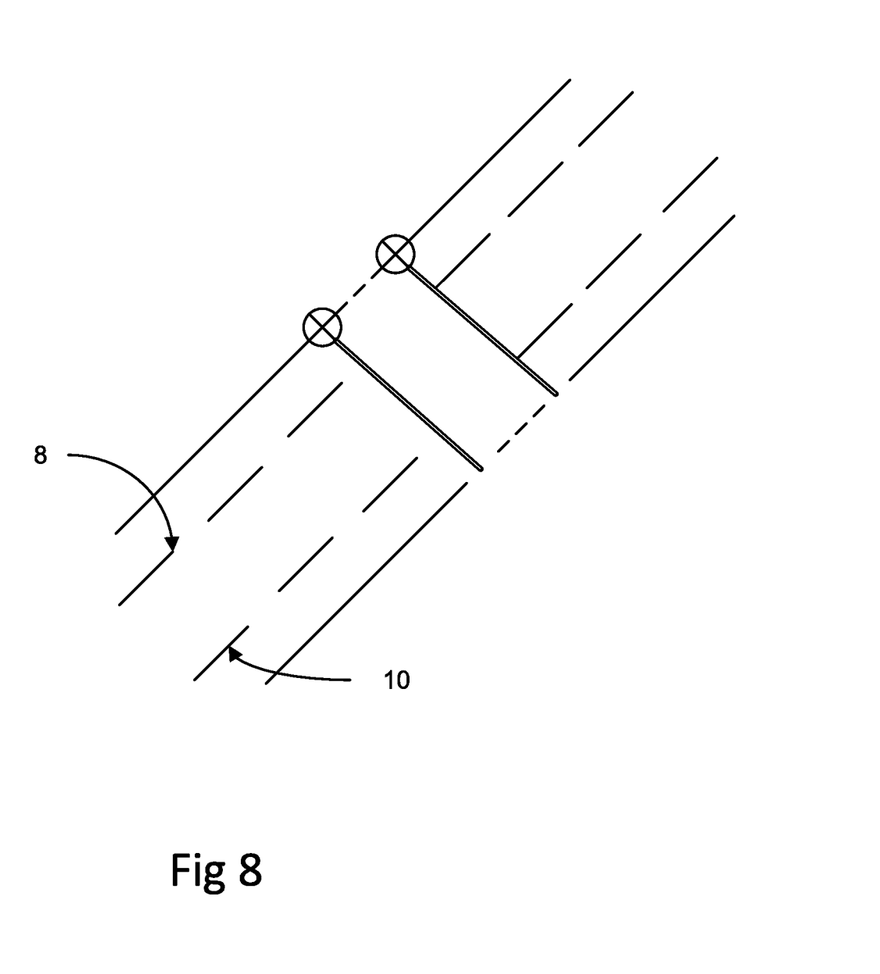
FIG. 8 is an overhead view of an emergency lighting system according to another exemplary embodiment.

The embodiment of FIG. 8 uses the same first 8 and second lines 10 of markers along the aisle as in FIG. 6. In this embodiment, the exit identifier comprises a pair of electrical light beams 22, 24 arranged to be projected across the cabin.

Desirably, the portion of the aircraft cabin in which the photoluminescent markers are located includes lighting adapted and arranged to charge the photoluminescent markers. It is important that the lighting is arranged such that there is sufficient light to adequately charge the photoluminescent markers.

The photoluminescent markers include a photoluminescent pigment or a mixture of photoluminescent pigments or combination of compounds including at least one photoluminescent pigment that meet the emergency system output requirements to be met. The pigment or mixture of pigments are elected to ensure that the there is sufficient charging from through the any topcoat or protective layer that is selected. In other embodiments, the topcoat may be selected to allow sufficient transmission for charging and output from a photoluminescent pigment or mixture of photoluminescent pigments used in the marker. In some cases, color films can be incorporated in the photoluminescent markers.

An emergency lighting system can be retrofitted to an aircraft having an aircraft cabin having rows of seats, at least one aisle, and at least one exit to provide an aircraft in accordance with the first aspect, by installing a first and a second line along opposing sides of the aisle of the aircraft cabin, each line comprising a series of non-continuous photoluminescent markers and installing the an exit path identifier arranged to identify an exit.

The method includes installing a first line located on one side of the aisle and a second line located on a second opposing side of the aisle, with each line including a non-continuous series of photoluminescent markers separated by at least a longitudinal distance in the direction of the respective line. Each line includes an alternating series of first and second markers in which the first photoluminescent markers have a first length and the second markers have a second length. At least the second markers are located on or adjacent to a seat adjacent to the aisle and the first markers are arranged to block the non-exit paths. Either the first length is the same as the second length or the first length is shorter than the second length.

The photoluminescent markers can be arranged to have a series of markers separated by a distance. The markers may be provided on the seat or seat frame. The markers may be provided between the seat rows. In some embodiments, that markers may include a series of first markers having a length and a series of second markers having a second length, where the first length is shorter that the second length. The relatively shorter and relatively longer markers may be arranged to alternate along the length of the aisle. The relatively shorter markers may be provided between the rows of seats in the aircraft cabin. The relatively longer markers may be provided on the seats or seat frames.

Markers are provided to block non-exit paths. In some embodiments, the first markers may be relatively shorter than the second markers. The first markers may be provided as a "dot" having a diameter which can be considered to be the length of the marker. In other embodiments, the first markers may be relatively shorter lengths of photoluminescent marker.

In other embodiments, the photoluminescent markers have the same length and are separated by a distance. The distance may be arranged to be at least 10% of the length of the markers.

It will be appreciated that an aircraft in accordance with the present disclosure does not require quite so many markers to be installed and the skilled person will appreciate that with aircraft the saving of even a small amount of weight is considered to be significant as it results in reduction of the fuel required for each flight.

Further it has been found to be an advantage to be able to clearly indicate and block non-exit paths.

What is claimed is:

1. An aircraft comprising an aircraft cabin having a number of rows of seats, at least one aisle, and at least one exit, wherein the aircraft further comprises:
an emergency lighting system comprising:

a first line located on one side of the aisle and a second line located on a second opposing side of the aisle, each line comprising a non-continuous series of photoluminescent markers separated by at least a longitudinal distance in the direction of the respective line; and an exit path identifier arranged to guide passengers from the aisle to the exit;

wherein:

each line comprises an alternating series of first and second markers;

the first photoluminescent markers have a first length and the second markers have a second length;

at least the second markers are located on or adjacent to a seat adjacent to the aisle and the first markers are arranged to block the non-exit paths; and either the first length is the same as the second length or the first length is shorter than the second length.

2. The aircraft of claim 1, wherein the first and second lines each comprise a series of markers, and wherein the first length is substantially the same as the second length.

3. The aircraft of claim 1, wherein the first and second lines each comprise a series of first photoluminescent markers and series of second markers, wherein the first length is shorter than the second length.

4. The aircraft of claim 1, wherein the distance is one of:
at least 10% of a length of the markers; or
at least 6 inches (15 cm).

5. The aircraft of claim 1, wherein the exit identifier comprises at least one photoluminescent marker leading to the exit.

6. The aircraft of claim 5, wherein the exit identifier comprises a first and a second photoluminescent marker located on either side of a path to the exit.

7. The aircraft of claim 1, wherein the exit identifier comprises at least one powered light.

8. The aircraft of claim 7, wherein the exit identifier comprises an electrically powered light beam.

9. The aircraft of claim 8, wherein the light beam projects a beam of light across the cabin, and wherein the light beam indicates the location of the exit with a projected line, marker, word, or image.

10. The aircraft of claim 1, wherein at least one of the first and second exit path markers comprises at least one photoluminescent marker and the or each photoluminescent marker comprises one or more markings visible in low light conditions.

11. The aircraft of claim 10, wherein the markings include at least one marking selected from the group consisting of arrows, words, lines, shapes, and different colors.

12. The aircraft of claim 10, wherein the photoluminescent markers comprise a photoluminescent pigment or a mixture of photoluminescent pigments or combination of compounds including at least one photoluminescent pigment.

13. The aircraft of claim 10, wherein the photoluminescent markers comprise a covering or a protective layer.

14. The aircraft of claim 10, wherein the photoluminescent markers are fabricated from non-flammable materials.

15. The aircraft of claim 1, wherein the first length is the same as the second length or the first length is shorter than the second length.

16. A method of retro-fitting an emergency lighting system to an aircraft having an aircraft cabin having rows of seats, at least one aisle, and at least one exit, the method comprising:

installing a first line located on one side of the aisle and a second line located on a second opposing side of the aisle, each line comprising a non-continuous series of photoluminescent markers separated by at least a longitudinal distance in the direction of the respective line, wherein:

each line comprises an alternating series of first and second markers;

the first photoluminescent markers have a first length and the second markers have a second length;

at least the second markers are located on or adjacent to a seat adjacent to the aisle and the first markers are arranged to block the non-exit paths; and either the first length is the same as the second length or the first length is shorter than the second length; and installing the an exit identifier arranged to guide passengers from the aisle to the exit.

* * * * *